(12) United States Patent
Bovington

(10) Patent No.: US 6,217,760 B1
(45) Date of Patent: Apr. 17, 2001

(54) WASTE WATER TREATMENT SYSTEM

(76) Inventor: Tom Bovington, P.O. Box 650, Helena, MT (US) 59624

( * ) Notice: Subject to any disclaimer, the term of this patent is extended or adjusted under 35 U.S.C. 154(b) by 0 days.

(21) Appl. No.: 09/302,381

(22) Filed: Apr. 30, 1999

(51) Int. Cl.[7] .............................. C02F 3/28; B01D 24/24
(52) U.S. Cl. ...................... 210/195.1; 210/196; 210/265; 210/532.2; 210/299; 137/118.01
(58) Field of Search ................. 210/195.1, 196, 210/197, 259, 299, 532.2, 265; 405/40, 41; 137/118.01

(56) References Cited

U.S. PATENT DOCUMENTS

| | | | |
|---|---|---|---|
| 494,455 | * | 3/1893 | Barkhaur, Jr. .......................... 405/40 |
| 1,673,373 | * | 6/1928 | Peters, Jr. ......................... 137/118.01 |
| 2,328,029 | * | 8/1943 | Porter ............................... 137/118.01 |
| 2,903,166 | * | 9/1959 | Kuljian ............................. 137/118.01 |
| 4,303,350 | | 12/1981 | Dix .......................................... 405/36 |
| 4,818,384 | | 4/1989 | Mayer ..................................... 210/86 |
| 4,822,485 | | 4/1989 | Mayer ..................................... 210/123 |
| 4,838,731 | * | 6/1989 | Gavin .................................... 405/40 |
| 5,098,568 | * | 3/1992 | Tyson ................................. 210/532.2 |
| 5,480,561 | * | 1/1996 | Ball et al. ............................. 210/196 |
| 5,609,754 | * | 3/1997 | Stuth .................................. 210/195.1 |
| 5,676,828 | * | 10/1997 | Kallenbach et al. ................. 210/196 |
| 5,997,735 | * | 12/1999 | Gorton ................................ 210/196 |

OTHER PUBLICATIONS

Flow Splitter Basin Orenco Systems Inc Sep. 8, 1993.

\* cited by examiner

Primary Examiner—Christopher Upton
(74) Attorney, Agent, or Firm—Jerry Johnson

(57) ABSTRACT

The waste water treatment system comprises a waste water treatment facility having an inlet for the entry of waste water and an outlet, and a re-circulation tank including an inlet and an outlet. The inlet of the waste water treatment facility is in fluid communication with the outlet of the re-circulation tank. The system includes a distribution chamber including an upstanding wall, a floor, an inlet, and at least two outlets conduits. A first outlet conduit is in fluid communication with the re-circulation tank; and a second outlet conduit is in fluid communication with a discharge conduit.

At least one flow distribution chamber outlet conduit typically includes an inlet opening which is disposed at the same vertical height as the floor of the distribution chamber to allow the entry of waste water which has entered into the distribution chamber, such that substantially no waste water entering into the distribution chamber through the inlet will be retained within the chamber. Each flow distribution chamber outlet conduit typically comprises a pipe having a wall, a portion of which is vertically disposed within the distribution chamber. The vertical disposed portion of the pipe wall typically further includes a plurality of vertically spaced inlet openings passing through the wall. Each outlet conduit pipe typically passes through the floor. The flow distribution chamber may further include more than one outlet conduit in fluid communication with the re-circulation tank. The distribution chamber includes a re-circulation manifold disposed beneath the floor to collect the flows from the outlet conduits.

The waste water treatment facility is typically a sand filter which includes flow distribution pipes have orifices. The present invention includes orifice shields for preventing the filter media from entering into the orifices of the flow distribution pipes. The orifice shields include both flat and concave orifice covers to disperse the water which sprays out of the flow distribution pipes orifices.

24 Claims, 7 Drawing Sheets

7B         7C

WASTE WATER TREATMENT SYSTEM

BACKGROUND

Flow distribution boxes have typically been used in waste water systems to split and distribute the flow of waste water effluent that has been treated by a waste water treatment system. Particularly, flow distribution boxes have been used in waste water systems to split the waste water effluent into separate equal flows and distributed the flows between several distribution pipes disclosed within a drain field or leech field.

Flow distribution boxes used for this previously described purpose often retain waste water within the interior of the distribution box. This waste water is prone to freezing in cold weather which may result in a blockage of flow or possibly damage to the box. Additionally, the retention of waste water within the flow distribution box may result in undesirable odors emanating from the distribution box.

Additionally, if the flow is not accurately split within the distribution box, uneven flows of waste water may result in the distribution pipes. These uneven flows cause clogging in some lines or excessive saturation of portions of the drain field or leech field.

For these reasons, there is a need for flow distribution boxes that are able to accurately split the flow of waste water entering into the distribution box, and to distribute the flows to separate outlets where each outlet receives the same flow. This allows the distribution box to provide evenly distributed flows within a drain field or leech field.

Small waste water treatment systems often use a primary treatment facility such as a septic tank and a secondary treatment facility such as a sand filter or a de-nitrification filter. Waste water which has first been treated in the septic tank and subsequently treated by the secondary treatment facility may benefit from being re-circulated gain through the secondary treatment facility. In some situations, the waste water which has first been treated in the septic tank and subsequently treated by the secondary treatment facility may benefit from being re-circulated again through the primary treatment facility and the secondary treatment facility.

Waste water which will be re-circulated may be collected in a reservoir or chamber which serves as a re-circulation tank.

In some waste water systems, the septic tank which also served as the primary treatment facility may be used as the re-circulation tank. In this situation, a portion of the waste water that has passed through the secondary treatment facility will be re-circulated back into the septic tank. Subsequently, this re-circulated flow will be re-circulated through the secondary treatment facility. Another portion of the waste water will be discharged to an outlet which feeds a drain field, leech field, lagoon, or other treatment facility. A flow distribution box may be used to split the flow leaving the secondary treatment facility into the desired portions of waste water which will be re-circulated and that which will be discharged to the outlet.

In other waste systems, a separate re-circulation tank may be used. In this situation, a portion of the waste water that has passed through the secondary treatment facility will be passed to the re-circulation tank so that it may be re-circulated through the secondary treatment facility. Another portion of the waste water will be discharged to an outlet which feeds a drain field, leech field, lagoon, or other treatment facility. Again, a flow distribution box may be used to split the flow leaving the secondary treatment facility into the desired portions of waste water which will be collected in the re-circulation tank for re-circulation through the secondary treatment facility and that which will be discharged to the outlet.

There is a need for flow distribution boxes that may be used in a re-circulation system to accurately split the flow of waste water entering into the distribution box into two or more flows, and to distribute the split flows to outlets where a desired ratios of flows is achieved. This allows the distribution box to provide an accurate ratio of re-circulation flow to discharge flow.

There is a further need that the distribution box used in this way allow for the changing of ratios of the flows which are split and distributed between a discharge pipe and a re-circulation pipe.

There is a further need that a distribution box used in this way will not retain waste water which may cause freezing damage and undesirable odors.

SUMMARY

The waste water treatment system of the present invention satisfies the previously mentioned needs.

The waste water treatment system comprises a waste water treatment facility having an inlet for the entry of waste water and an outlet, and a re-circulation tank including an inlet and an outlet. The inlet of the waste water treatment facility is in fluid communication with the outlet of the re-circulation tank. The system includes a distribution chamber including an upstanding wall, a floor, an inlet, and at least two outlets conduits. A first outlet conduit is in fluid communication with the re-circulation tank; and a second outlet conduit is in fluid communication with a discharge conduit.

Typically, at least one flow distribution chamber outlet conduit includes an inlet opening which is disposed at the same vertical height as the floor of the distribution chamber to allow the entry of waste water which has entered into the distribution chamber, such that substantially no waste water entering into the distribution chamber through the inlet will be retained within the chamber.

Each outlet conduit typically comprises a pipe having a wall, a portion of which is vertically disposed within the distribution chamber. The vertical disposed portion of the pipe wall typically further includes a plurality of vertically spaced inlet openings passing through the wall. Each outlet conduit pipe typically passes through the floor.

The flow distribution chamber may further include at least a third outlet conduit in fluid communication with the re-circulation tank. In this version, the distribution chamber includes a re-circulation manifold disposed beneath the floor. The first and third outlet conduits are in fluid communication with the re-circulation manifold. The flow distribution chamber may further include at least a fourth outlet conduit in fluid communication with the discharge conduit. In this version, the distribution chamber includes a discharge manifold disposed beneath the floor. The second and fourth outlet conduits are in fluid communication with the discharge manifold. Specifically, the re-circulation manifold may further include a plurality of fittings. An outlet conduit pipe may be disposed in each fitting of the re-circulation manifold. Similarly, the discharge manifold may also include a plurality of fittings. An outlet conduit pipe may be disposed in each fitting of the discharge manifold. The manifolds allow for the selective setting of the desired ratio of re-circulation outlet conduits to discharge outlet conduits.

Accordingly, the desired ratio of re-circulation flow to discharge flow may be selectively set for the system.

The waste water treatment system may include a primary treatment chamber which typically comprises a septic tank for anaerobic digestion and gavitational precipitation of waste water solids. The waste water treatment facility is typically a secondary treatment facility that comprises a sand filter. The sand filter comprises a horizontal bed of solid particulate media, and wherein the inlet of the sand filter is disposed proximate to the top of the horizontal bed, and wherein the outlet of the sand filter is disposed proximate to the bottom of the horizontal bed.

The waste water treatment system further includes an orifice shield adapted for selective placement on the exterior surface of a fluid distribution pipe which is placed in solid particulate media. The orifice shield is adapted to cover an orifice in the pipe to prevent entry of the solid media into the orifice.

The orifice shield comprises an orifice cover plate, wherein the cover plate includes a bottom surface for facing an orifice in a fluid distribution pipe. The bottom surface is either planar or convex. Securing means for securing the cover plate on the exterior surface of the fluid distribution pipe are included in the orifice shield. The securing means includes a bottom surface for contact with the exterior surface of the fluid distribution pipe, and a top surface. The orifice shield further includes spacing means for elevating the plate in relation to the exterior surface of the pipe. The orifice shield is typically separable from the distribution pipe on which it may selectively be placed, but in some cases may be permanently secured to the pipe.

The securing means typically comprises at least one pair of arms for wrapping at least partially around the circumference of the distribution pipe. The arms are typically resilient and may be flexed away from each other to allow the orifice shield to be selectively placed on a distribution pipe. The orifice shield may include two spaced apart pairs of arms. In this version the cover plate extends between the two spaced apart pairs of arms.

The spacing means may comprise the securing means. In this version, the cover plate is disposed on the top surface of the securing means, and the material thickness of the securing means elevates the plate in relation to the exterior surface of the distribution pipe. The spacing means may further comprise spacers for selective placement between the top surface of the securing means and the bottom surface of the cover plate. These spacers may be permanently secured between the securing means and the cover plate, as the orifice shield may comprise a unitary injected molded item, or if the orifice shield comprises a glued assembly of separate elements.

The waste water treatment system of the present invention provides several benefits which have been previously unavailable in waste water treatment systems.

A first benefit of the waste water treatment results from the manner in which the waste water which enters the flow distribution chamber is fed into outlets. Each outlets conduit pipe includes at least one inlet opening which is disposed at the same vertical height as the floor of the distribution chamber. This location of inlet openings ensures that substantially no waste water will be retained in the chamber after the flow of waste water into the chamber has stopped. Accordingly, no damage will result from the freezing of water within the distribution chamber or in the conduits of the distribution chamber.

A second benefit results from the manner in which small inlet openings are disposed in the vertical outlet conduit pipes. The small inlet openings are disposed in a vertically spaced orientation. This ensures that the waste water which flows into the distribution chamber will accumulate in the chamber. This enables that all inlet openings within the chamber will be fed with waste water at the same rate. Should a large amount of waste water enter into the distribution chamber, the waste water will rise to the level of the open top outlet conduit pipes. This will allow for the rapid release of waste water into the outlet conduits. Even this rapid release will occur with even amounts of water entering into each outlet conduit pipe, as the open top of each pipe is disposed at the same vertical height.

A third benefit results from the use of outlet manifolds which may be used to attach a plurality of outlet conduit pipes, and to subsequently combine the flow within each pipe that is attached to the manifold. This manifold system allows for the desired ratios of re-circulation to discharge flows to be achieved. The manifolds are provided with a plurality of fittings, each of which may include an outlet conduit pipe. A number of different re-circulation to discharge flow ratios may be produced by this system. The ratio depends on the number of outlet conduit pipes that are used which are attached to the re-circulation conduit, and the number of outlet conduit pipes that are used which are attached to the discharge conduit.

Should the distribution chamber of the present invention be used as a flow splitting and distribution box for a plurality of separate distribution pipes of a drain field, the manifolds will typically not be required. Nevertheless, the orientation of the vertical outlet conduit pipes in relation to the floor of the distribution chamber provides the benefits of even flows in each distribution pipe, and the absence of waste water retention within the chamber.

The waste water treatment system also includes orifice shields which provide a dispersed flow of the waste water which exits an orifice and which contacts the plate of the shield. The plate may include a flat or convex surface which will disperse the water spray from the orifice, and will result in the saturation of a large area proximate to the shield. Accordingly, the orifice shields of the present invention provide a high dispersal of waste water within a sand filter or drain filter which uses orifices in distribution lines to feed waste water. This results in a large region within the bed of the sand filter or drain field within which waste waster may be treated. This is a large improvement over orifice shields which cause small super saturated regions adjacent to the orifice shields.

These and other benefits of the present invention will be apparent after review of the following drawings, description, and claims.

DRAWINGS

FIG. 7B shows a portion of a version of the orifice shield.

FIG. 7B shows a portion of a version of the orifice shield.

DESCRIPTION

Figure 1:
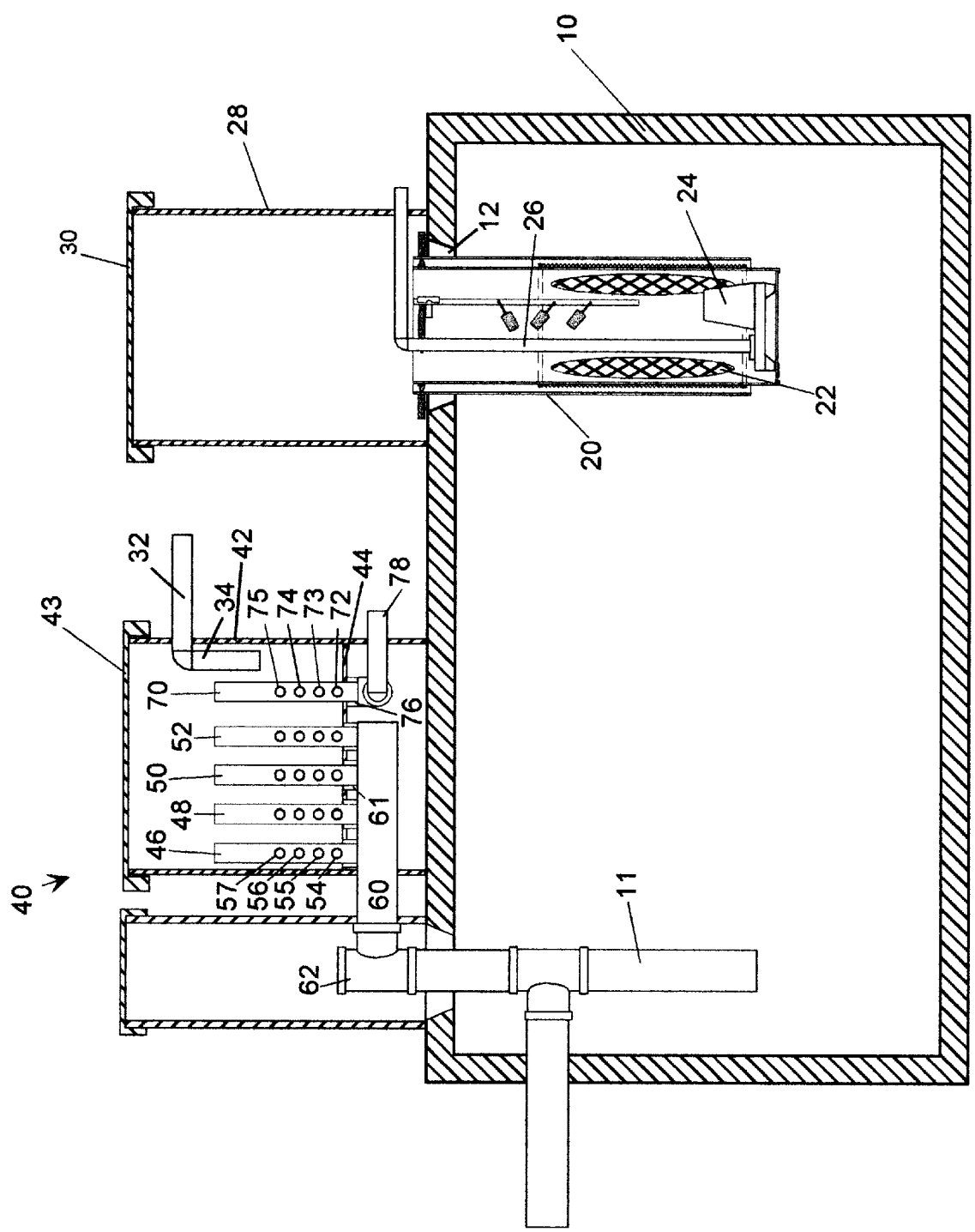
FIG. 1 shows a first version of a portion of the waste water treatment system of the present invention.
Figure 2:
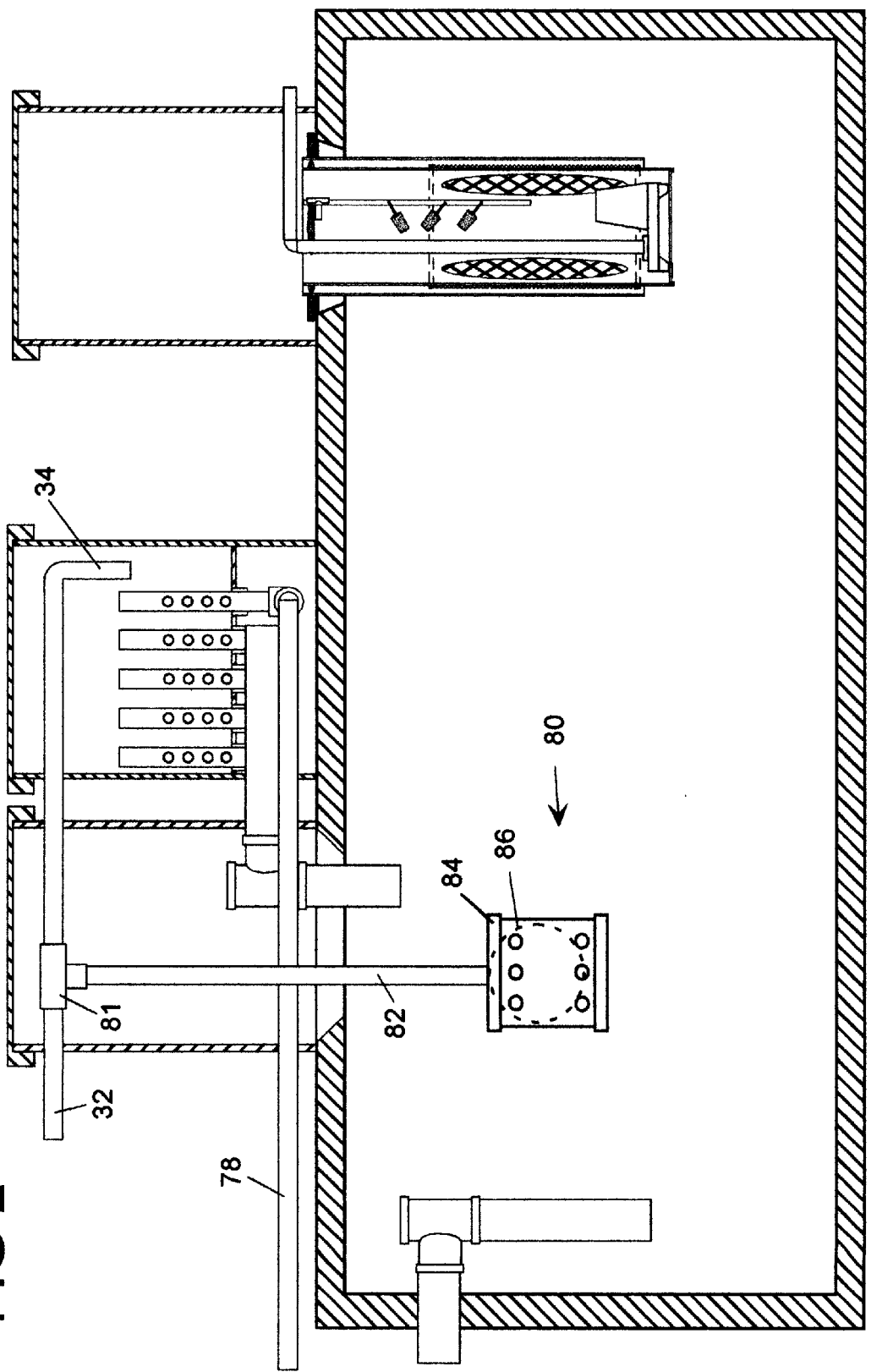
FIG. 2 shows a second version of a portion of the waste water treatment system of the present invention.
Figure 3:
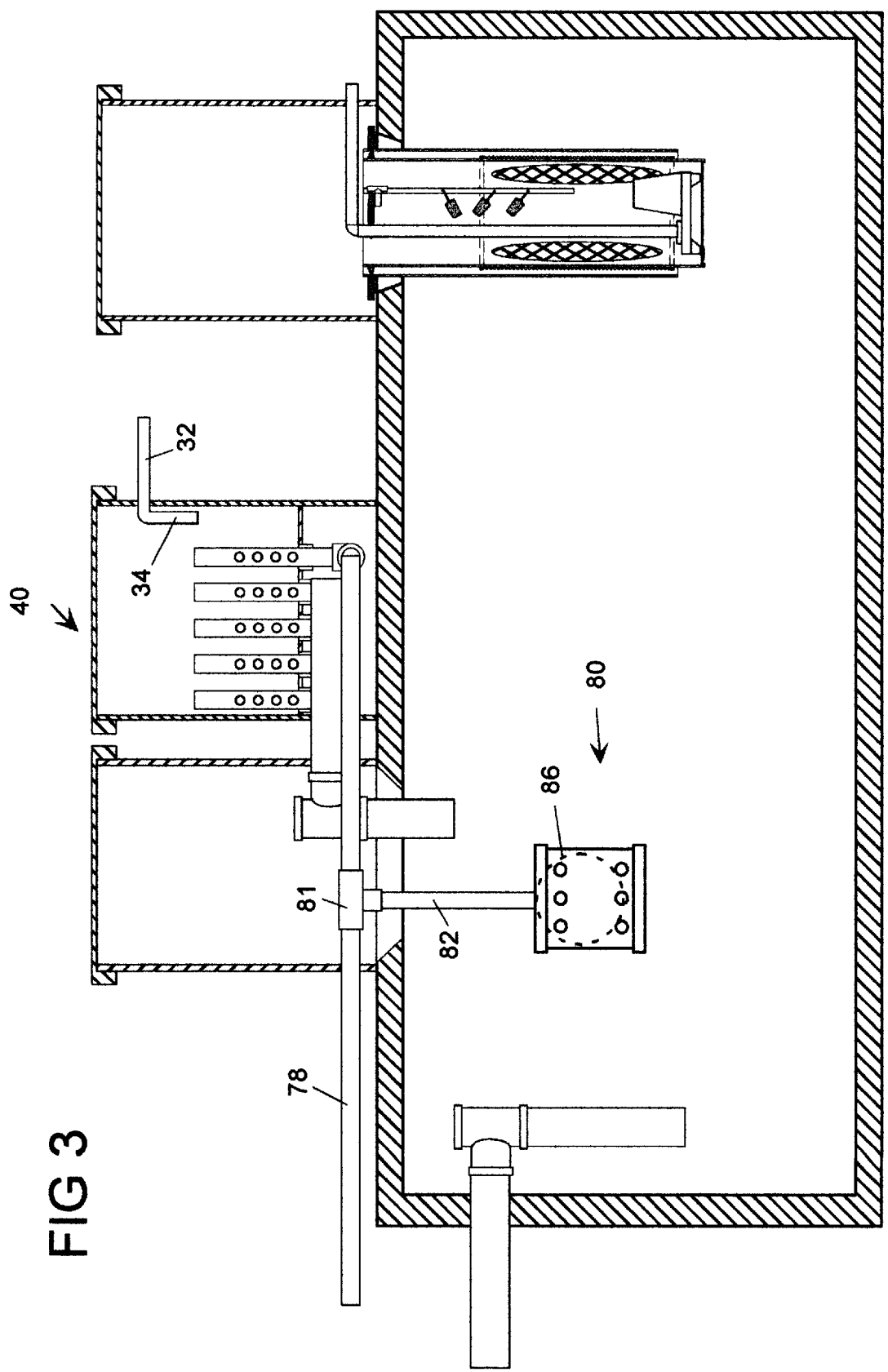
FIG. 3 shows a third version of a portion of the waste water treatment system of the present invention.

FIGS. 1 through 3 show three versions of a portion of the waste water treatment system of the present invention.

Specifically, FIG. 1 shows a re-circulation chamber 10. In some cases the re-circulation chamber 10 may comprise a primary treatment chamber which is typically a septic tank. Waste water enters the septic tank at the T inlet fitting 11. A waste water filter 20 is disposed in the re-circulation chamber 10. The waste water filter 20 includes a filter cartridge 22 having screens or other filtering surfaces to restrict the passage of waste water solids that may enter the interior of the filter. The filtered waste water is discharged from the filter interior by a pump 24 through outlet pipe 26.

Figure 6:
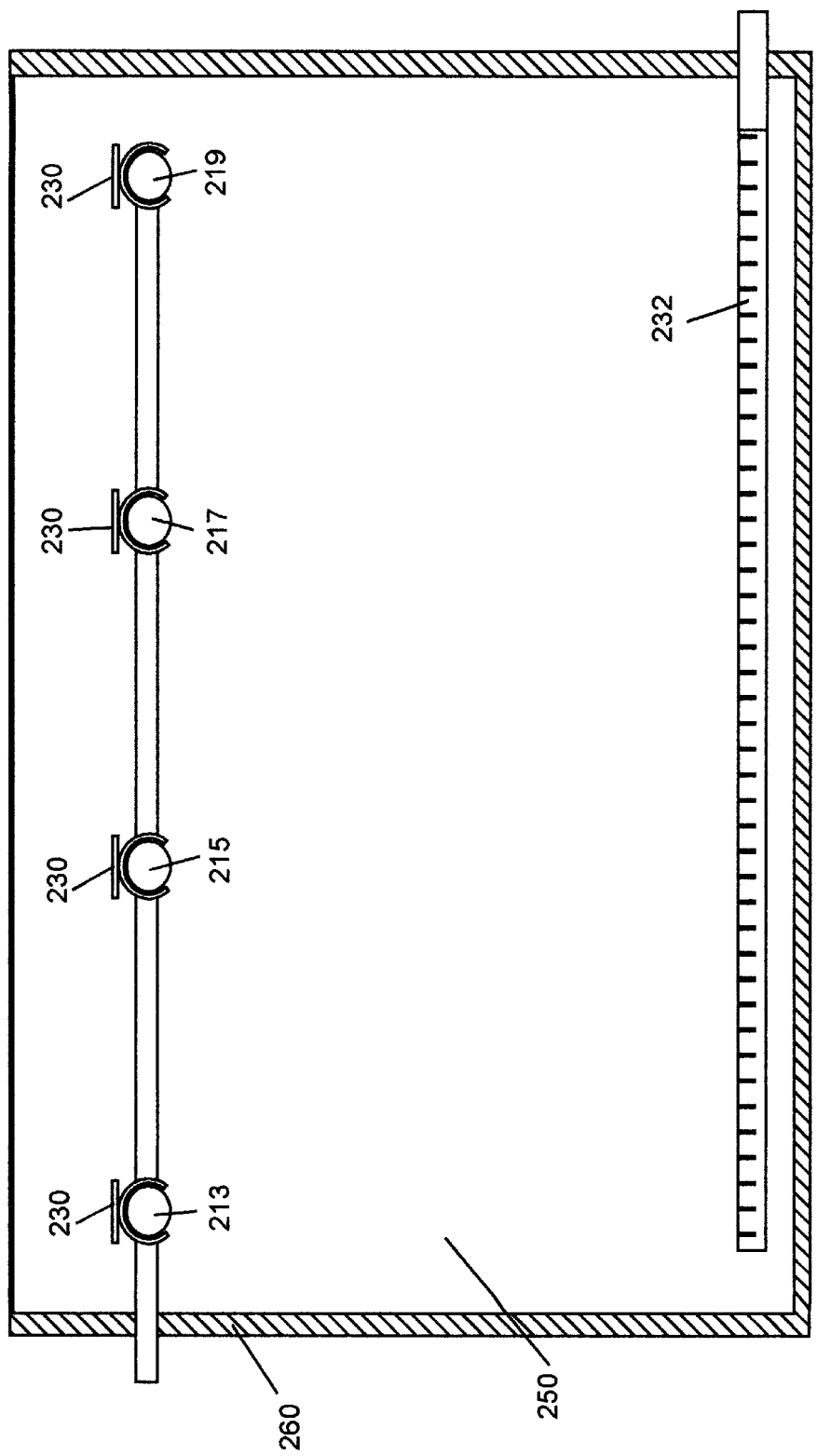
FIG. 6 shows a sand filter which is a secondary treatment filter that may be used in the waste water treatment system of the present invention.

The waste water filter 20 is disposed in an opening 12 in the re-circulation tank which is covered by a riser 28 and a cover lid 30 which is typically at ground level. The waste water which is discharged through the outlet pipe 26 has typically undergone primary treatment in a septic tank which includes gravitational precipitation of waste water solids, as well as anaerobic digestion of the solids through biological activity within the tank. Again, the re-circulation chamber 10 may in some cases be a septic tank. If the re-circulation tank is separate from the septic tank, a septic tank which is not shown in this figure would have proceeded the re-circulation tank. The primary treatment may often be followed by a secondary treatment. The secondary treatment may include a sand filter as is shown in FIG. 6 or a de-nitrification filter, as is shown in U.S. Pat. No. 5,534,147, which is incorporated herein by this reference. In either case the outlet pipe 26 would enter the secondary treatment filter at an inlet.

Regardless of the secondary treatment used, it is often desirable to return or re-circulate a portion of the waste water which has passed through the secondary treatment filter back to the re-circulation tank. It is typically desirable to re-circulate only a percentage of the flow leaving the secondary treatment filter and to discharge a portion of this flow to a drain field, leech field, or lagoon.

Accordingly, FIG. 1 shows a flow splitting distribution chamber 40 which receives an outlet flow of waste water from the secondary treatment filter. This flow is transferred to the flow distribution chamber through outlet pipe 32 and enters the flow distribution chamber at the inlet fitting 34.

The flow distribution chamber includes a structure suitable for receiving this flow and to properly split the flow into the desired flow ratios required for re-circulation back to the re-circulation tank and discharge. As shown, the flow distribution chamber includes a vertical peripheral wall 42 which has a circular cross section, a lid 43, and a floor 44 disposed a short distance above the bottom of the vertical peripheral wall 42. The floor provides a surface on which the waste water flowing into the flow distribution chamber is temporarily supported. The floor is sealed within the vertical wall 42 so that waste water does not seep beneath the floor.

Extending through the floor 44 from a position beneath the floor are vertical outlet conduit pipes 46, 48, 50, and 52.

Each of these pipes includes a series of vertically spaced inlet openings 54, 55, 56 and 57 which extend through the wall of the pipes. These inlet openings allow waste water to enter into the interior of the pipes. The pipes also include an open top which is also an inlet opening. The bottom inlet opening 54 of each of the outlet conduit pipes is at the same level as the floor. Accordingly, waste water which enters into the interior of the flow distribution chamber will not be retained within the chamber, but will exit the chamber through one of the inlet openings that are at the level of the floor.

Also shown in FIG. 1 is an outlet manifold 60 which includes a series of pipe fittings 61 which receive the vertical outlet conduit pipes 46, 48, 50, and 52. The manifold serves to combine the flow within each of the pipes and passes this combined flow into the re-circulation outlet conduit 62.

A fifth outlet conduit pipe 70 is also shown extending above the floor from a position beneath the floor. This fifth outlet conduit pipe includes inlet openings 72, 73, 74, and 75 which are vertically spaced and which extend through the pipe wall. Inlet opening 72 is disposed at the same level as the floor 44. Inlet openings 72, 73, 74, and 75 are disposed at the same vertical position as inlet openings 54, 55, 56, and 57. The pipe is also disposed in a fitting 76 of the discharge outlet conduit 78.

In use, waste water which flows into the flow distribution chamber will temporarily accumulate in the chamber due to the small size of the openings. This accumulation of the flow ensures that all of the outlet conduit pipes will receive an equal volume of flow. As the water level rises in the chamber, more of the vertically spaced inlet openings will receive waste water. Should the water level rise to the top of the pipes, the water will exit the chamber quickly though the open top of the pipes.

Shortly after the flow of waste water entering into the flow distribution chamber ceases, the entire flow distribution chamber will be emptied of waste water due to the location of the bottom inlet openings at the floor level.

As the outlet pipes are all of the same size, and as four outlet pipes 46, 48, 50, and 52 feed waste water to the re-circulation manifold 60, and only one pipe 70 feed the discharge outlet conduit 78, 80 percent of the flow exits from the re-circulation manifold and 20 percent exits the discharge outlet conduit. The re-circulation flow, as shown in this figure re-enters the re-circulation tank for further treatment. This 80% re-circulation flow to 20% discharge flow, or 4 to 1 ratio is only one example of the many re-circulation to discharge ratios that could be used.

Figure 1A:
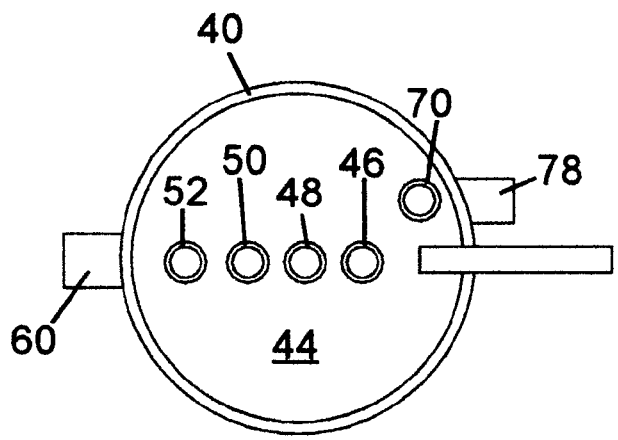
FIG. 1A is a top view of the flow distribution chamber included in FIG. 1.

FIG. 1A shows a top view of the location of outlet conduit pipes within this version of the flow distribution chamber.

Briefly, FIGS. 2 and 3 both show the inclusion of a ball float mechanism 80 into the waste water treatment system of the present invention. FIG. 2 shows the inclusion of a ball float mechanism 80 into the conduit 32 which is in fluid communication with the outlet from the secondary treatment filter. FIG. 3 shows the inclusion of the ball float mechanism 80 into the discharge conduit 78. In each of these versions, the ball 86 of the ball float mechanism responds to the water level within the tank. Specifically, the ball 86 will form a seal with the bottom of the vertical pipe 82 if the water level is high enough within the tank which results in upward buoyancy forces on the ball forcing the ball upward. Should the water level in the tank be low, the buoyancy forces on the ball will not be sufficient to push the ball upward to close of the pipe. Consequently wall will be able to pass around the ball.

In greater detail, FIG. 2 shows a T fitting 81 in the pipe 32 which feeds the flow distribution chamber with waste water from the sand filter or other secondary waste water treatment facility. Should the water level in the specific tank be low, the ball 86 will not seal the pipe 82, and the water entering into the T fitting will pass down the pipe 82, past the ball float 86, directly into the re-circulation tank. Accordingly, no splitting and flow distribution of this flow will occur in the flow distribution chamber 40, as all of the waste water is re-circulated directly back into the re-circulation tank. This will increase the level of the water within the tank which will return the volume of waste water within the tank to a desirable level for operation.

Were the water level within the tank high, the ball float 86 would form a seal with the bottom of the vertical pipe 82 and prevent water from being discharged from the pipe directly into the re-circulation tank. Instead, the waste water would flow into the flow distribution chamber where the flow would be split into a 80% re-circulation flow to 20% discharge flow, and distributed as previously described in FIG. 1.

FIG. 3 shows an alternative position of the ball float mechanism 80. As shown, the ball float mechanism 80 is included in the discharge outlet conduit 78. Specifically, the T fitting is inserted into the discharge outlet conduit 78 such that the discharge flow may be intercepted by the ball float mechanism 80, and re-circulated back into the re-circulation tank.

In use, the flow from the secondary treatment facility enters the flow distribution chamber 40 through the inlet conduit 32. This flow is split by the flow distribution chamber into a 80% re-circulation flow and a 20% discharge flow as has been previously described. The 20% discharge flow in the discharge outlet conduit 78 may or may not be actually discharged due to the inclusion of the ball float mechanism. Again, if the water level within the tank is low, the 20% discharge flow will pass down the vertical pipe 82 to be returned to the tank. This results in a 100% re-circulation flow. Should the water level be high, the ball 86 forms a seal with the bottom of the vertical pipe 82 and causes the 20% discharge flow to proceed through the discharge conduit 78.

As the ball float mechanism in FIG. 3 is only handling the 20% discharge flow, as opposed to the handling of 100% flow as was shown in FIG. 2, the ball in FIG. 3 may be much smaller or lighter to function properly in this capacity.

In either of the examples of FIG. 2 or FIG. 3, the ball float serves as a short circuit which will divert waste water directly to the re-circulation tank should the water level in the re-circulation tank be too low for desired operation.

Figure 4A:
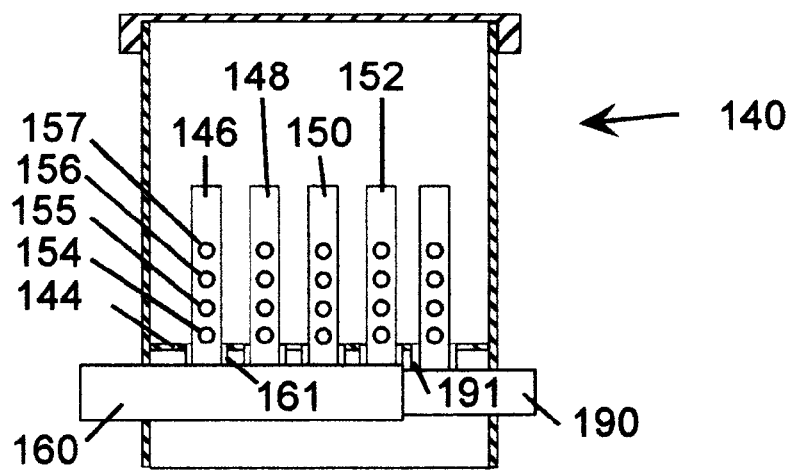
FIG. 4A is a side view showing an alternative version of the flow distribution chamber.
Figure 4B:
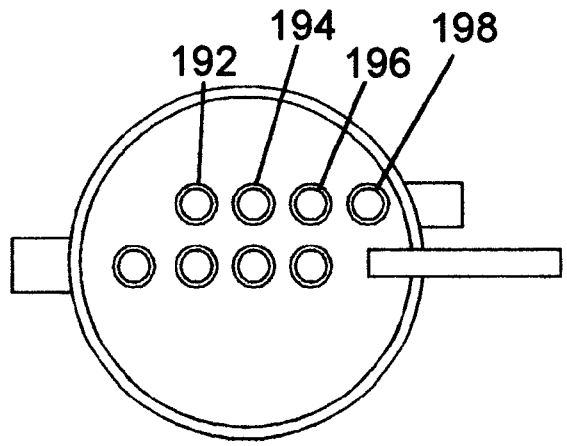
FIG. 4B is a top view showing an alternative version of the flow distribution chamber.

FIG. 4A is a side view, and FIG. 4B is a top view showing an alternative version of the flow distribution chamber 140. In this version, which is usable in FIGS. 1–3, there are four outlet conduit pipes 146, 148, 150, and 152 which feed the re-circulation manifold 160, as well as four outlet conduit pipes 192, 194, 196, and 198 which feed a discharge outlet manifold 190. This example shows four outlet conduit pipes feeding both the outlet manifold and the discharge outlet manifold. In reality, only as many pipes feeding each manifold would be used to produce the desired ratio of re-circulation to discharge flows. Accordingly, the socket fittings 161 in the re-circulation outlet manifold and the socket fittings 191 in the discharge manifold might include a solid pipe instead of having an outlet conduit pipe to restrict water from passing out of the flow distribution chamber through the solid pipes. The flow distribution chamber allows the operator of the system a great deal of flexibility in achieving the desired level of treatment for waste water in the system.

Figure 5A:
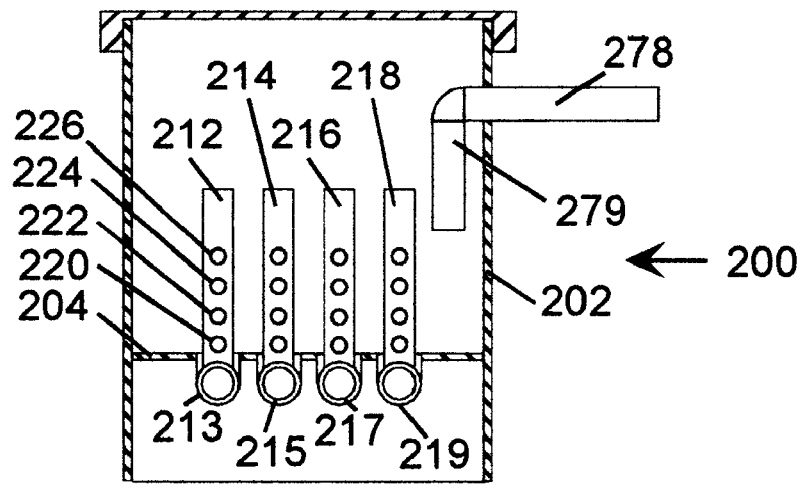
FIG. 5A is a side view showing an alternative version of the flow distribution chamber.
Figure 5B:
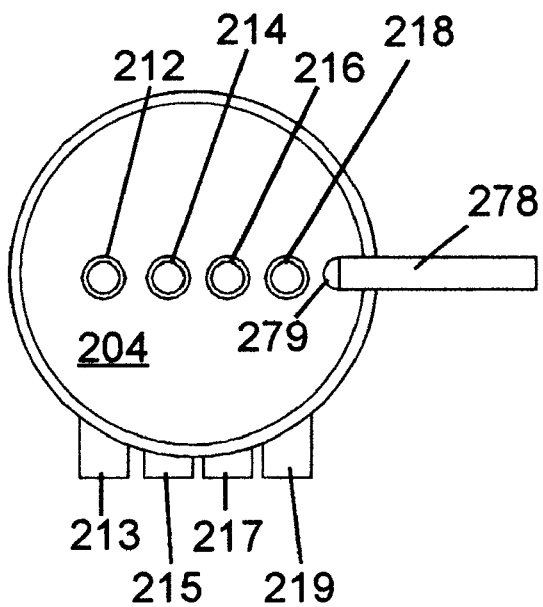
FIG. 5B is a top view showing an alternative version of the flow distribution chamber.

FIG. 5A is a side view, and FIG. 5B is a top view showing another alternative version of the flow distribution chamber 200. This version would typically be used to split a flow of waste water and distribute this flow to separate outlet conduits each of which feed a distribution line of a sand filter or drain filter.

As shown, the flow distribution chamber 200 includes a vertical peripheral wall 202, a floor 204, and four vertical outlet conduit pipes 212, 214, 216, and 218 which extend vertically through the floor. Outlet conduit pipes 212, 214, 216, and 218 are attached beneath the floor to outlet conduits 213, 215, 217, and 219, respectively. Each of the outlet conduits 213, 215, 217, and 219 may constitute a flow distribution pipe, or may be attached to a flow distribution pipe which feeds a sand filter or drain field.

Each of the vertical outlet conduit pipes includes a series of vertically spaced inlet openings 220, 222, 224, and 226 which extend through the wall of the pipe. The bottom inlet opening is disposed at the same level as the floor 204.

In use, waste water effluent will enter the flow distribution chamber through the inlet fitting 279 of pipe 278. This waste water will temporarily accumulate within the flow distribution chamber as the small inlet openings of the outlet conduit pipes restrict the rate that the waste water is discharged from the flow distribution chamber. By slowing the rate of discharge of waste water through the outlet conduit pipes, the flow distribution chamber ensures that an even flow rate will exist in each pipe.

The accumulated water will enter the inlet openings of each of the vertical outlet conduit pipes. This will draw down the water level within the chamber. The last water in the chamber will exit the bottom inlet openings of each pipe leaving the flow distribution chamber without any retained waste water.

FIG. 6 shows a sand filter which is a secondary treatment filter that may be used in the waste water treatment system of the present invention. The sand filter, as shown, includes four horizontal flow distribution pipes 213, 215, 217, and 219 similar to the outlet conduits shown exiting the flow distribution chamber of FIGS. 5A and 5B. The flow distribution pipes deliver waste water to the filter through a series of orifices 220 in each pipe. Orifice shields 230 are disposed on the pipes at the orifice locations to prevent granular media, which in this case is sand or gravel 250, from entering into the pipes and from plugging the orifices. The waste water that exists the orifices undergoes aerobic digestion as the waste water seeps through the filter media. Accumulation pipe 232 is used to return the waste water back to the distribution chamber or to transfer the waste water to a tertiary treatment chamber.

Figure 7A:
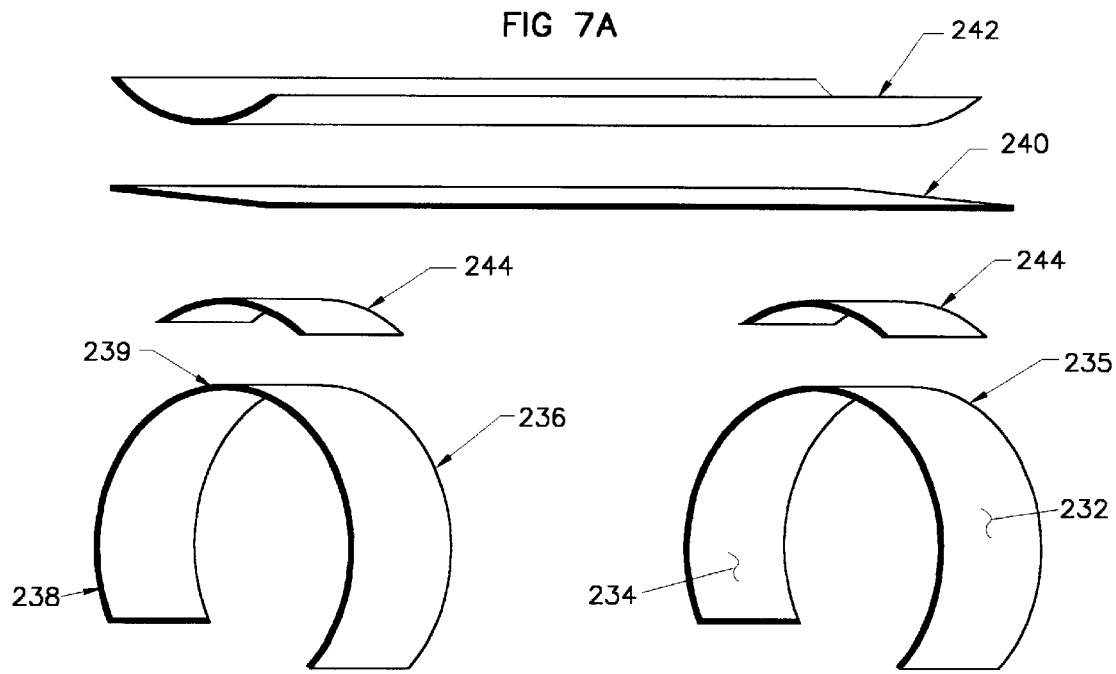
FIG. 7A show an orifice shield which is used in the waste water treatment system of the present invention.
Figure 7A:
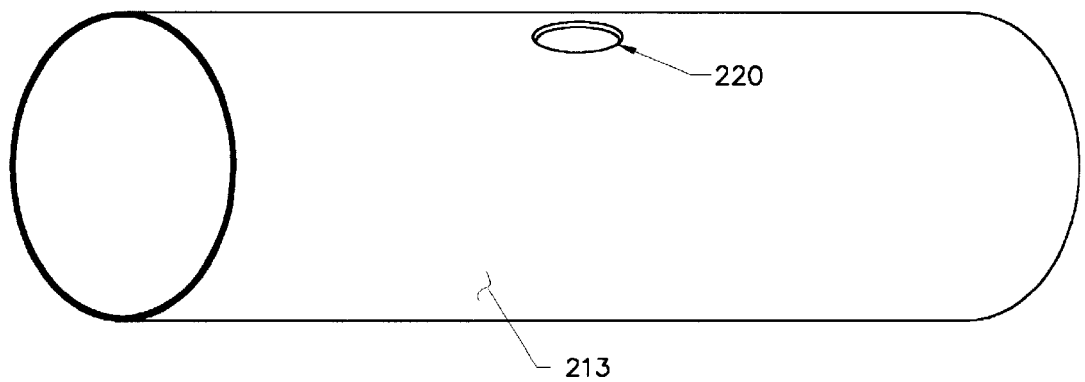
Figure 7A:
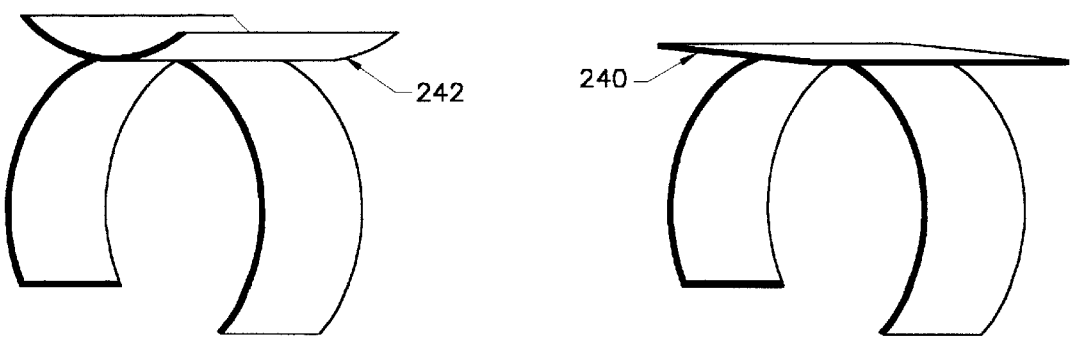

FIGS. 7A, 7B, and 7C show the orifice shield 230 in greater detail. The orifice shield 230 includes securing means which comprise a first set of resilient arms 232 and 234 which in this version are attached together to form an arch shaped clip 235, and a second set of resilient arms 236 and 238 which are also attached together to form an arch shaped clip 239.

A cover plate, which may be flat 240 or convex 242, is attached to the two arch shaped clips and bridges a gap separating the two clips. The thickness of the material used in the arch shaped clips will serve to elevate the bottom surface of the cover plate in relation to the outer surface of flow distribution pipe 213. However, additional spacers 244 may be used if desired. The space which is necessary to separate the cover plate bottom surface from the outer surface of the flow distribution pipe is determined by the size of grains used in the particulate media of the filter, and the size of the waste water solid particles that are allowed into the flow distribution pipe. The spacing must be smaller than the grain size to prevent particulate media grains from entering into the flow distribution pipe or from plugging the orifices. The spacing must be larger than the size of solid waste particles that may be in the flow distribution pipe to prevent the plugging of orifices by the solid waste particles.

FIGS. 7B and 7C show the attachment of the flat cover plate 240 and convex cover plate 242 to the arch shaped clip.

Although the orifice shield of the present invention is shown as a multiple piece assembly, it is understood that the orifice shield may be manufactured as a single homogenous unit. The multiple piece assembly, however, does allow for the insertion of a spacer of a desired thickness.

It is understood that various modifications and changes in form or detail could readily be made without departing from the spirit of the invention. It is therefore intended that the invention be not limited to the exact form and detail herein shown and described, nor to anything less than the whole of the invention herein disclosed and hereinafter claimed.

I claim:

1. A waste water treatment system comprising:
   a re-circulation tank comprising a reservoir of waste water, the re-circulation tank having an inlet conduit and an outlet conduit;
   a waste water treatment facility separate from the re-circulation tank; the waste water treatment facility including an inlet conduit and an outlet conduit;
   wherein the inlet conduit of the waste water treatment facility is in fluid communication with the outlet conduit of the re-circulation tank;
   a flow distribution chamber including an inlet conduit and at least first and second outlet conduits; wherein the at least first and second outlet conduits comprise pipe; and, wherein the flow distribution chamber further includes an upstanding wall, and a floor; and, wherein the floor is constructed of a substantially impervious material and supports waste water within the upstanding wall of the distribution chamber; and
   wherein the inlet conduit of the flow distribution chamber is in fluid communication with the outlet conduit of the waste water treatment facility; and, wherein the first outlet conduit is in fluid communication with the re-circulation tank;
   and, wherein the waste water treatment system further includes a discharge conduit; and, wherein the second outlet conduit is in fluid communication with a discharge conduit; and wherein the discharge conduit discharges waste water from the waste water treatment system;
   wherein at least one flow distribution chamber outlet conduit extends downwardly from the floor to a position immediately beneath the floor, and further includes and inlet opening which is disposed at the same vertical height as the floor, wherein waste water within this outlet conduit flows from a first position above the floor to a second position immediately beneath the floor, wherein substantially no waste water entering into the distribution chamber through the inlet conduit will be retained within the chamber.

2. The waste water treatment system of claim 1, wherein each outlet conduit pipe includes a wall, a portion of which is vertically disposed within the distribution chamber; the vertical disposed portion of the pipe wall further including a plurality of vertically spaced inlet openings passing through the pipe wall.

3. The waste water treatment system of claim 2, wherein each flow distribution chamber outlet conduit pipe passes through the floor of the flow distribution chamber.

4. The waste water treatment system of claim 2, wherein the flow distribution chamber further includes at least a third outlet conduit; and wherein the flow distribution chamber includes a re-circulation manifold disposed beneath the floor; wherein the first and third outlet conduits are in fluid communication with the re-circulation manifold; and, wherein the re-circulation manifold is in fluid communication with the inlet conduit of the re-circulation tank; and,
   wherein the flow distribution chamber further includes at least a fourth outlet conduit; and wherein the flow distribution chamber includes a re-circulation manifold disposed beneath the floor; wherein the second and forth outlet conduits are in fluid communication with the re-circulation manifold; and, wherein the re-circulation manifold is in fluid communication with the discharge conduit; and
   wherein the re-circulation manifold further includes a plurality of fittings, and wherein an outlet conduit pipe may be disposed in each fitting of the re-circulation manifold; and wherein the discharge manifold further includes a plurality of fittings, and wherein an outlet conduit pipe may be disposed in each fitting of the discharge manifold.

5. The waste water treatment system of claim 1, wherein the re-circulation tank comprises a septic tank comprising a primary treatment facility for anaeorbic digestion and gravitational precipitation of waste water solids.

6. The waste water treatment system of claim 1, wherein the waste water treatment facility comprises a sand filter.

7. The waste water treatment system of claim 6, wherein the sand filter comprises a horizontal bed of solid particulate media, and wherein the inlet conduit of the sand filter is disposed proximate to the top of the horizontal bend, and wherein the outlet conduit of the sand filter is disposed proximate to the bottom of the horizontal bed.

8. The waste water treatment system of claim 1, wherein the flow distribution chamber further includes at least a third outlet conduit; and wherein the flow distribution chamber includes re-circulation manifold disposed beneath the floor; wherein the first and third outlet conduits are in fluid communication with the re-circulation manifold; and, wherein the re-circulation manifold is in fluid communication with the inlet conduit of the re-circulation tank.

9. The waste water treatment system of claim 8, wherein the flow distribution chamber further includes at least a fourth outlet conduit; and wherein the flow distribution chamber includes a re-circulation manifold disposed beneath the floor; wherein the second and fourth outlet conduits are in fluid communication with the re-circulation manifold; and, wherein the re-circulation manifold is in fluid communication with the discharge conduit.

10. A waste water treatment system comprising:
   a re-circulation tank comprising a reservoir of waste water, the re-circulation tank having an inlet conduit and an outlet conduit;
   a waste water treatment facility separate from the re-circulation tank; the waste water treatment facility including an inlet conduit and an outlet conduit;
   wherein the inlet conduit of the waste water treatment facility is in fluid communication with the outlet conduit of the re-circulation tank;

a flow distribution chamber including an inlet conduit and at a least first and second outlet conduits; and, wherein the flow distribution chamber further includes an upstanding wall, and a floor; wherein the inlet conduit of the flow distribution chamber is in fluid communication with the outlet conduit of the waste water treatment facility; and wherein the first outlet conduit is in fluid communication with the re-circulation tank;

and, wherein the waste water treatment system further includes a discharge conduit; and, wherein the second outlet conduit of the flow distribution chamber is in fluid communication with a discharge conduit; and wherein the discharge conduit discharges waste water from the waste water treatment system; and wherein each flow distribution chamber outlet conduit comprises a pipe; and, wherein each outlet conduit pipe includes a wall, a portion of which is vertically disposed within the distribution chamber; the vertical disposed portion of the pipe wall further including a plurality of vertically spaced inlet openings passing through the pipe wall.

11. The waste water treatment system of claim 10, wherein each outlet conduit pipe passes through the floor.

12. The waste water treatment system of claim 10, wherein at least one flow distribution chamber outlet conduit includes an inlet opening which is disposed at the same vertical height as the floor of the distribution chamber to allow the entry of waste water which has entered into the distribution chamber; wherein substantially no waste water entering into the distribution chamber through the inlet conduit will be retained within the chamber.

13. The waste water treatment system of claim 10, wherein the re-circulation tank comprises a septic tank comprising a primary treatment facility for anaerobic digestion and gravitational precipitation of waste water solids.

14. The waste water treatment system of claim 10, wherein the waste water treatment facility comprises a sand filter.

15. The waste water treatment system of claim 14, wherein the sand filter comprises a horizontal bed of solid particulate media, and wherein the inlet conduit of the sand filter is disposed proximate to the top of the horizontal bed, and wherein the outlet conduit of the sand filter is disposed proximate to the bottom of the horizontal bed.

16. The waste water treatment system of claim 10, wherein the flow distribution chamber further includes at least a third outlet conduit; and wherein the flow distribution chamber includes a re-circulation manifold disposed beneath the floor; wherein the first and third outlet conduits are in fluid communication with the re-circulation manifold; and, wherein the re-circulation manifold is in fluid communication with the inlet conduit of the re-circulation tank.

17. The waste water treatment system of claim 16, wherein the flow distribution chamber further includes at least a fourth outlet conduit; and wherein the flow distribution chamber includes a re-circulation manifold disposed beneath the floor; wherein the second and fourth outlet conduits are in fluid communication with the re-circulation manifold; and, wherein the re-circulation manifold is in fluid communication with the discharge conduit.

18. The waste water treatment system of claim 10, wherein the flow distribution chamber further includes at least a third outlet conduit; and wherein the flow distribution chamber includes a re-circulation manifold disposed beneath the floor; wherein the first and third outlet conduits are in fluid communication with the re-circulation manifold; and, wherein the re-circulation manifold is in fluid communication with the inlet conduit of the re-circulation tank; and, wherein the flow distribution chamber further includes at least a fourth outlet conduit; and wherein the flow distribution chamber includes a re-circulation manifold disposed beneath the floor; wherein the second and fourth outlet conduits are in fluid communication with the re-circulation manifold; and, wherein the re-circulation manifold is in fluid communication with the discharge conduit; and, wherein the re-circulation manifold further includes a plurality of fittings, and wherein an outlet conduit pipe may be disposed in each fitting of the re-circulation manifold; and wherein the discharge manifold further includes a plurality of fittings, and wherein an outlet conduit pipe may be disposed in each fitting of the discharge manifold.

19. A waste water treatment system comprising:

a re-circulation tank comprising a reservoir of waste water, the re-circulation tank having an inlet conduit and an outlet conduit;

a waste water treatment facility separate from the re-circulation tank; the waste water treatment facility including an inlet conduit and an outlet conduit;

wherein the inlet conduit of the waste water treatment facility is in fluid communication with the outlet conduit of the re-circulation tank;

a flow distribution chamber including an inlet conduit and at least first and second outlet conduits; and, wherein the flow distribution chamber further includes an upstanding wall, and a floor; wherein the inlet conduit of the flow distribution chamber is in fluid communication with the outlet conduit of the waste water treatment facility; and, wherein the first outlet conduit is in fluid communication with the re-circulation tank;

and, wherein the waste water treatment system further includes a discharge conduit; and, wherein the second outlet conduit of the flow distribution chamber is in fluid communication with a discharge conduit; and wherein the discharge conduit discharges waste water from the waste water treatment system; and wherein the flow distribution chamber further includes at least a third outlet conduit; and wherein the flow distribution chamber includes a re-circulation manifold disposed beneath the floor; wherein the first and third outlet conduits are in fluid communication with the re-circulation manifold; and, wherein the re-circulation manifold is in fluid communication with the inlet conduit of the re-circulation tank.

20. The waste water treatment system of claim 19, wherein the flow distribution chamber further includes at least fourth outlet conduit; and wherein the flow distribution chamber includes a re-circulation manifold disposed beneath the floor; wherein the second and fourth outlet conduits are in fluid communication with the re-circulation manifold; and, wherein the re-circulation manifold is in fluid communication with the discharge conduit.

21. The waste water treatment system of claim 19, wherein the flow distribution chamber further includes at least a fourth outlet conduit; and wherein the flow distribution chamber includes a re-circulation manifold disposed beneath the floor; wherein the second and fourth outlet conduits are in fluid communication with the re-circulation manifold; and, wherein the re-circulation manifold is in fluid communication with the discharge conduit; and, wherein the re-circulation manifold further includes a plurality of fittings, and wherein an outlet conduit pipe may be disposed in each fitting of the re-circulation manifold; and wherein the discharge manifold further includes a plurality of fittings, and wherein an outlet conduit pipe may be disposed in each fitting of the discharge manifold.

22. A waste water flow distribution chamber including an upstanding wall, and a floor; and, wherein the floor is constructed of a substantially impervious material and supports waste water within the upstanding wall of the distribution chamber; and, an inlet conduit for the entry of waste water into the flow distribution chamber, and at least two outlets conduits; wherein the at least two outlet conduit comprise pipe;

wherein at least one flow distribution chamber outlet conduit extends downwardly from the floor to a position immediately beneath the floor, and further includes an inlet opening which is disposed at the same vertical height as the floor, wherein waste water within this outlet conduit flows from a first position above the floor to a second position immediately beneath the floor; wherein substantially no waste water entering into the distribution chamber through the inlet conduit will be retained within the chamber.

23. The waste water flow distribution chamber of claim 22, wherein each outlet conduit pipe includes a wall, a portion of which is vertically disposed within the distribution chamber; the vertical disposed portion of the pipe wall further including a plurality of vertically spaced inlet openings passing through the wall.

24. The waste water flow distribution chamber of claim 23, wherein each outlet conduit pipe passes through the floor.

* * * * *